United States Patent
Raja (10) Patent No.: US 12,193,989 B2
(45) Date of Patent: Jan. 14, 2025

(54) ELECTRIC WALKING ASSISTING VEHICLE

(71) Applicant: SUZUKI MOTOR CORPORATION, Hamamatsu (JP)

(72) Inventor: Gopinath Raja, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 571 days.

(21) Appl. No.: 17/545,398

(22) Filed: Dec. 8, 2021

(65) Prior Publication Data
US 2022/0183920 A1    Jun. 16, 2022

(30) Foreign Application Priority Data
Dec. 15, 2020 (JP) ................................ 2020-207549

(51) Int. Cl.
*A61H 3/04* (2006.01)

(52) U.S. Cl.
CPC .......... *A61H 3/04* (2013.01); *A61H 2003/043* (2013.01)

(58) Field of Classification Search
CPC ............................ A61H 3/04; A61H 2003/043
See application file for complete search history.

(56) References Cited

U.S. PATENT DOCUMENTS

| | | | |
|---|---|---|---|
| 9,650,061 B2 | 5/2017 | Katayama et al. | |
| 10,639,226 B1 * | 5/2020 | Keyes | A61H 3/04 |
| 2016/0221595 A1 | 8/2016 | Hane | |
| 2017/0001656 A1 * | 1/2017 | Katayama | A61H 3/04 |
| 2020/0315880 A1 | 10/2020 | Raja et al. | |

FOREIGN PATENT DOCUMENTS

| | | | | | |
|---|---|---|---|---|---|
| CN | 107303235 A | * | 10/2017 | | |
| EP | 3000456 A1 | * | 3/2016 | ............... | A61H 3/04 |
| JP | H07212911 A | * | 8/1995 | .......... | B60L 15/2009 |
| JP | 20161371135 A | | 8/2016 | | |
| JP | 2017012546 A | | 1/2017 | | |
| JP | 6620326 B2 | | 11/2019 | | |
| JP | 2020168999 A | | 10/2020 | | |
| WO | 2015053245 A1 | | 4/2015 | | |
| WO | WO-2016013534 A1 | * | 1/2016 | ............... | A61H 3/04 |

OTHER PUBLICATIONS

Office Action issued on Mar. 15, 2024 in counterpart JP Application No. 2020-207549 with Machine translation.

* cited by examiner

*Primary Examiner* — Jacob D Knutson
(74) *Attorney, Agent, or Firm* — TROUTMAN PEPPER HAMILTON SANDERS LLP (57) ABSTRACT

The electric walking assisting vehicle includes: a vehicle body; left and right driving wheels; left and right motors which individually transmit power to the left and right driving wheels; universal wheels; gripping parts provided in an upper portion of the vehicle body and are gripped by a user in a standing and walking posture; a gripping sensor detecting that the gripping parts are gripped by the user; left and right rotation speed sensors individually detecting rotation speeds of the left and right driving wheels; and a control unit controlling the left and right motors. The control unit generates torque in the left and right motors in accordance with a torque map which defines relationship between the rotation speeds of the left and right driving wheels detected by the left and right rotation speed sensors and torque command values of the left and right motors in a state in which the gripping sensor is gripped.

10 Claims, 6 Drawing Sheets

ELECTRIC WALKING ASSISTING VEHICLE

CROSS REFERENCE TO RELATED APPLICATION

The present application claims priority of Japanese Patent Application No. 2020-207549 filed Dec. 15, 2020. The entire contents of which are hereby incorporated by reference.

TECHNICAL FIELD

The present invention relates to an electric walking assisting vehicle.

BACKGROUND

A push cart-type electric walking assisting vehicle for a user having difficulty walking, such as the elderly, has been developed. For example, JP 6620326 B2 discloses a push cart in which driving torque of an electric motor is controlled such that a force pushing handlebars by a user is detected by a force sensor and an assist force is imparted in accordance with a magnitude and a direction of the detected force.

SUMMARY

Since this apparatus has a configuration in which a pressure (handle force) exerted on the handlebars by a user is detected by the force sensor (pressure sensor) attached in a part joining the handlebars and a supporting post and the assist force is determined, there has arisen a problem in that control and structure thereof are complicated.

In view of the abovementioned problem, the present invention has been devised. An object of the present invention is to provide an electric walking assisting vehicle which is operable to provide a stable assist by a simple configuration in accordance with circumstances.

To achieve the abovementioned object, an electric walking assisting vehicle according to the present invention includes: a vehicle body having a forward-backward direction and a width direction; left and right driving wheels provided spaced apart in the width direction of the vehicle body; left and right motors which are connected so as to respectively transmit power to the left and right driving wheels; universal wheels provided spaced apart from the left and right driving wheels in the forward-backward direction of the vehicle body; a gripping part provided in an upper portion of the vehicle body so as to be gripped by a user in a standing and walking posture; a gripping sensor for detecting that the gripping part is gripped by the user; left and right rotation speed sensors for individually detecting rotation speeds of the left and right driving wheels; and a control unit for controlling the left and right motors, wherein the control unit is configured to generate torque in the left and right motors in accordance with a torque map which defines relationships of the rotation speeds of the left and right driving wheels detected by the left and right rotation speed sensors and torque command values of the left and right motors in a state in which the gripping sensor is detecting the gripping.

Since the electric walking assisting vehicle according to the present invention is configured, as described above, to generate torque in the left and right motors in accordance with the rotation speeds of the left and right driving wheels, detected in conjunction with operations of pushing/pulling the vehicle body with the gripping parts gripped by a user, a force sensor (pressure sensor) which detects a force of pushing/pulling the gripping parts by the user is unnecessary, and thus, a vehicle body structure and control are simplified. In particular, it is not required to consider a tractive force detected by the force sensor by driving the left and right motors, thus leading to advantages in that a stable assist can be performed by simple operations.

DETAILED DESCRIPTION

Hereinafter, an Embodiment of the present invention will be described in detail with reference to the accompanying drawings.

Figure 1:
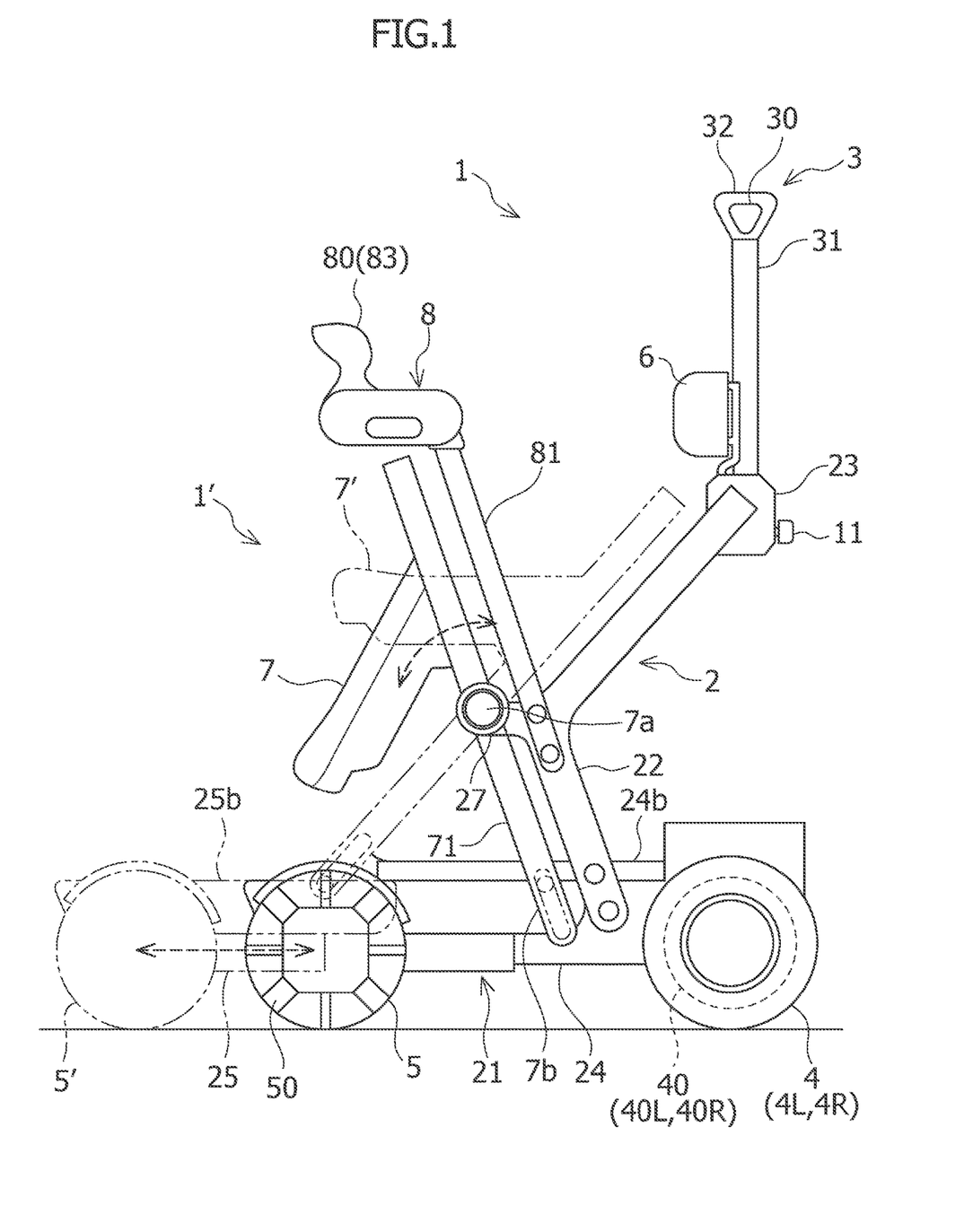
FIG. 1 is a side view showing an electric walking assisting vehicle according to an Embodiment of the present invention.

In FIG. 1, an electric vehicle 1 according to the Embodiment of the present invention includes a vehicle body 2, which is constituted of a moving base 21 (lower traveling body) and an upper frame 22 which is installed in a standing manner in the rear of the moving base 21 (a rear side base 24), and can be utilized in a walking assisting vehicle mode (1) indicated by a solid line in FIG. 1 and a compact electric vehicle mode (riding mode 1') indicated by a two-dot chain line in FIG. 1.

The moving base 21 includes the rear side base 24 (main body part) which is provided with left and right driving wheels 4 (rear wheels) and the upper frame 22 and a front side base 25 which is provided with left and right driven wheels 5 (front wheels), the front side base 25 is coupled to a front side of the rear side base 24 in a manner slidable in a front-rear direction, and a wheel base of the moving base 21 is configured in such a way as to be extendable and contractible.

The left and right driving wheels 4 are independently driven by left and right motor units 40 (40L and 40R) which are mounted on the rear side base 24. The left and right driven wheels 5 are constituted of universal wheels (omni-wheels or omnidirectional wheels), each of which includes, in a treading portion thereof, multiple rollers 50 which can rotate around an axis in a circumferential direction. The electric vehicle 1, as described later, can be steered, driven, and braked only by controlling the left and right motor units 40L and 40R.

The upper frame 22 is of an inverse U-shape or a gate shape in which upper ends of a pair of left and right side part frames installed in a standing manner upward from both left and right side parts of the rear side base 24 are joined by an upper end frame extending in a vehicle width direction, a lower end portion of a stem 31 of a rear handle 3 is rigidly coupled to a joining part 23 in a central portion of the upper end frame in the vehicle width direction, and a seat back 6 is supported on the joining part 23.

The rear handle 3 is of a T-bar shape and has a pair of left and right gripping parts which extend from a connecting part 32 with the upper end of the stem 31. The left and right gripping parts of the rear handle 3 are provided with a gripping sensor 30 which detects a state in which a user (or a helper) grips the gripping parts (hands-on). As the gripping sensor 30, a touch sensor such as a capacitance sensor and a pressure sensor can be used. In a case in which the user himself or herself uses the left and right gripping parts of the rear handle 3 in the walking assisting vehicle mode (1) and a case in which a helper or the like steers the electric vehicle with the user seated on a seat 7, the left and right gripping parts thereof serve as an operation part.

In a bending portion of the upper frame 22 (side part frame) in the middle of a height direction, a base part of a support frame 81 of an armrest 8 is fixed. A front end part of the armrest 8 on a right side, which is a depth side in FIG. 1, is provided with a riding mode operation unit 83, and a front end part of the armrest 8 on a left side, which is a front side in FIG. 1, is provided with a display unit 80 on an upper surface of the gripping parts (83) having the same shapes. The riding mode operation unit 83 is configured by a biaxial joystick, which is tiltable in a front-rear direction and a left-right direction, or the like.

Whereas a support frame 71 of the seat 7 (seat cushion) is pivotably supported to a pivotal supporting part 27, which protrudes forward from the bending portion of the upper frame 22 (side part frame), by a shaft 7a in the vehicle width direction, a lower end of the support frame 71 is coupled to the front side base 25 (pin) via a coupling part 7b (slot) in a pivotable and slidable manner.

By the above-described configuration, when the seat 7 in a folding position is rotated rearward and upward from in the walking assisting vehicle mode (1) indicated by a solid line in FIG. 1 and is thereby moved to a seating position 7' as indicated by a two-dot chain line in FIG. 1, in conjunction therewith, the front side base 25 slides forward, the moving base 21 is extended, and the riding mode (1') is set. In this state, an upper surface 25b of the front side base 25, which has moved to a front side of a tray 24b, can be used as a foot rest for a passenger.

Conversely, when the seat 7 is rotated frontward and downward from the riding mode (1') and is thereby moved to the folding position, the front side base 25 slides backward, the moving base 21 is shortened, and the walking assisting vehicle mode (1) in which the user can grip and operate the rear handle 3 while standing and walking is set.

Figure 2:
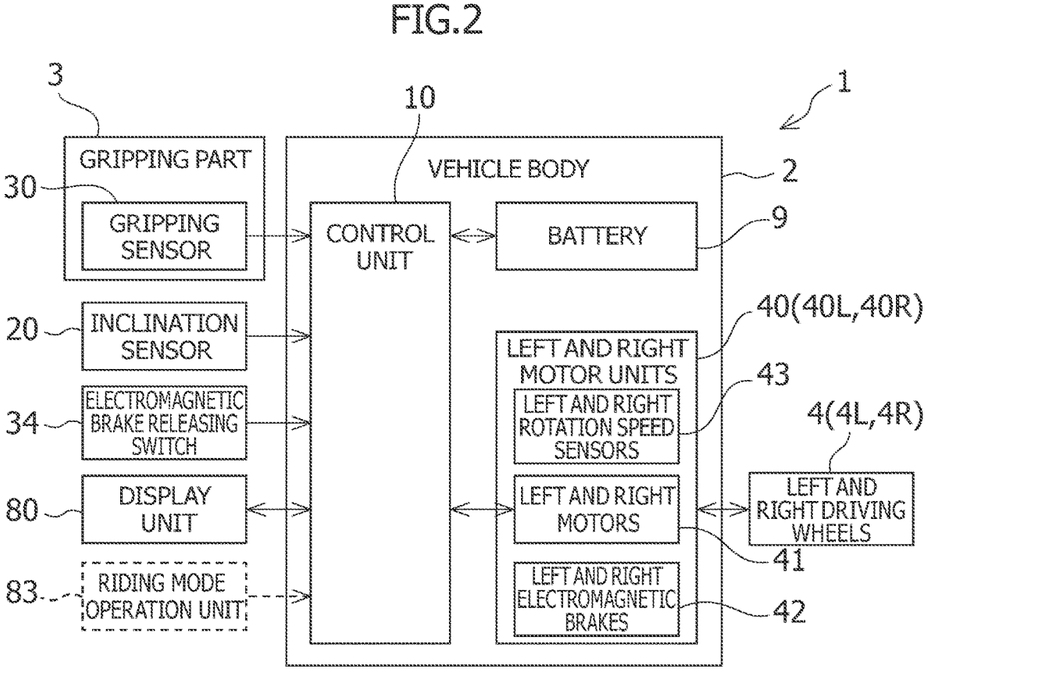
FIG. 2 is a block diagram showing a control system of the electric walking assisting vehicle according to the Embodiment of the present invention.

FIG. 2 is a block diagram showing a control system of the electric vehicle 1. The electric vehicle 1 includes a battery 9 which supplies electric power to the left and right motor units 40 (40L and 40R) and a control unit 10 for controlling the left and right motor units 40 (40L and 40R), and the control unit 10 includes an interlock mechanism which implements control corresponding to the walking assisting vehicle mode (1) and control corresponding to the riding mode (1').

In the walking assisting vehicle mode (1), the riding mode operation unit 83 is disabled, and based on detection information detected by an inclination sensor 20, left and right speed sensors 43, and the like and a previously set control map, the control unit 10 executes control of the left and right motor units 40 (40L and 40R). The gripping sensor 30 detects only gripping (hands-on/hands-off) of the rear handle 3 by the user and is not involved in torque control of the motor units 40.

On the other hand, in the riding mode (1'), the gripping sensor 30 is disabled, and based on an operation of the riding mode operation unit 83 and detection information detected by the inclination sensor 20, the control unit 10 executes control of the left and right motor units 40 (40L and 40R).

The control unit 10 is constituted of: a computer (microcomputer) which includes ROM having stored therein programs and data for executing the control in the abovementioned modes, RAM which temporarily stores an arithmetic processing result, a CPU which performs arithmetic processing, and the like; a driving circuit (motor driver) for left and right motors 41; a power supply circuit including a relay which turns on/off the electric power of the battery 9; and the like.

Each of the left and right motor units 40 (40L and 40R) includes a motor 41, an electromagnetic brake 42 for locking a rotor of the motor 41, and a rotation position sensor (43) for detecting a rotation position of the motor 41, and a driving shaft of the motor 41 is connected to each of driving wheels 4 (4L and 4R) via a deceleration gear, not shown, so as to be operable to transmit power thereto.

In the present Embodiment, each of the left and right motors 41 is constituted of a brushless DC motor which switches a current of each phase coil by a driving circuit so as to match each phase of the rotor, which is detected by the rotation position sensor (43), and as described later, in the walking assisting vehicle mode (1), a rotation position sensor (Hall sensor) is used as a rotation speed sensor 43.

In addition, the driving circuit of each of the left and right motors 41 includes a current sensor for detecting a coil current. This coil current corresponds to torque of each of the left and right motors 41, and the control unit 10 controls the coil current, thereby executing torque control of the left and right motors 41.

As the electromagnetic brake 42, a negative operating type electromagnetic brake, which locks the driving shaft of the motor 41 in a non-excited state and unlocks the driving shaft thereof in an excited state, is suitable. In addition, an electromagnetic brake releasing switch 34 is provided so as to release locking of the electromagnetic brake 42 and to allow the electric vehicle 1 to be moved in case of emergency such as reduction in a battery remaining amount.

The inclination sensor 20 is mounted on a circuit board of the control unit 10 which is mounted inside the moving base 21 (rear side base 24) of the vehicle body 2, and a biaxial inclination sensor for detecting inclination of the vehicle body 2 in a front-rear direction and a lateral direction, an acceleration sensor, or a multiaxial inertial sensor in which an acceleration sensor and an angular acceleration sensor (gyroscope sensor) are integrated can be used.

The electric vehicle 1 configured as described above is, in the walking assisting vehicle mode (1), operable to perform torque assist in all operations of forward moving/backward moving/turning by generating torque in the left and right motor units 40 (40L and 40R) in accordance with rotation speeds of the left and right driving wheels 4L and 4R, which are detected by the left and right rotation speed sensors 43, in conjunction with operations of pushing/pulling the vehicle body 2 in a state in which the user grips the rear handle 3.

First, basic control in the walking assisting vehicle mode (1) will be described by assuming forward moving/backward moving on a flat road.

Figure 3:
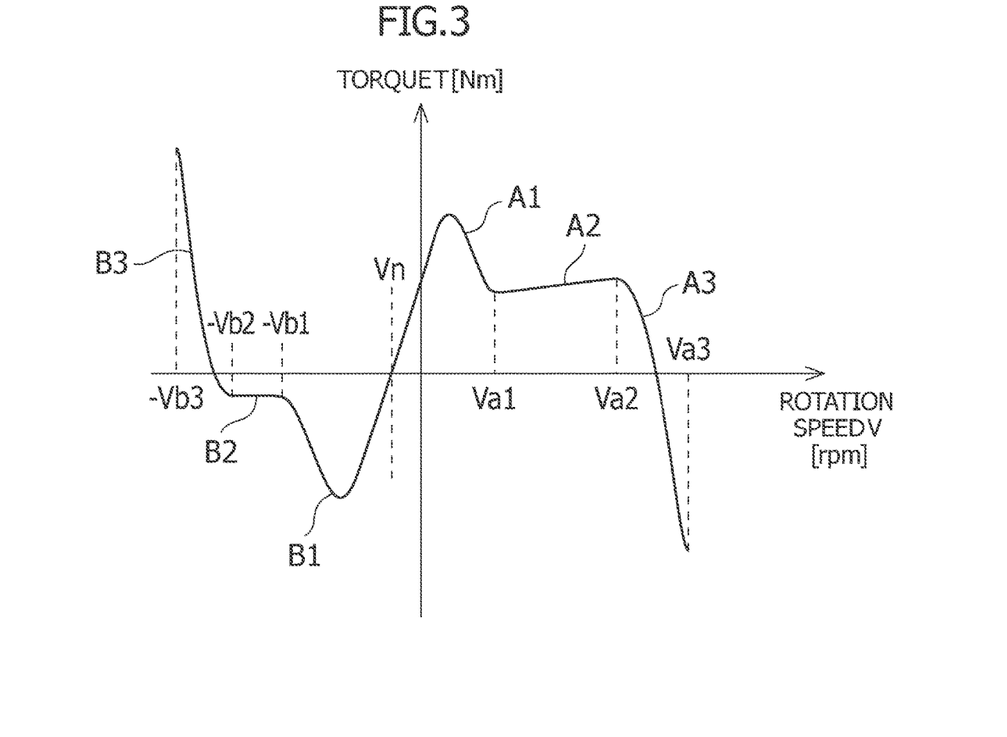
FIG. 3 is a torque map for controlling the electric walking assisting vehicle according to the Embodiment of the present invention.

FIG. 3 shows a torque map which defines relationship between a rotation speed V detected by each of the left and right rotation speed sensors 43 and a torque T command value of each of the left and right motors 41. As already described, in the present Embodiment, as the left and right rotation speed sensors 43, the rotation position sensors of the left and right motors 41 are used, and a rotation speed of each of the left and right driving wheels 4L and 4R is detected as the rotation speed V of each of the left and right motors 41 (rotors), which is increased by a gear ratio of the deceleration gear.

For example, in a case in which each of the left and right motors 41 is a three-phase brushless DC motor, up to ⅙ rotation of 60 degrees can be detected by three rotation position sensors (43) which are arranged at intervals of 120 degrees, and since when the gear ratio of the deceleration gear is 10:1 and each of the left and right driving wheels 4L and 4R rotates at 36 degrees, each of the left and right motors 41 (rotors) makes one rotation, as the rotation speed of each of the left and right motors 41 (rotors) or a number of revolution [rpm] per unit time, practically sufficient resolution can be obtained.

A basic operation in the walking assisting vehicle mode (1) is an operation of moving forward in a state in which the user grips the rear handle 3. In the torque map shown in FIG. 3, an operation origin Vn (neutral point) is set on a slightly negative side of the rotation speed V in order for the electric vehicle 1 not to move backward by initial rotation to a negative side (front side) in conjunction with an operation of gripping the rear handle 3 by the user.

By this configuration, even when the initial rotation to the negative side, made by the operation of gripping the rear handle 3 by the user, is detected, within the rotation speed Vn of each of the left and right driving wheels 4L and 4R, assist torque in a forward moving direction is generated, and only in a case in which the user has clear intention and performs an operation of pulling the rear handle 3 (a case in which a rotation speed in a minus direction is greater than Vn), assist torque in a backward moving direction is generated.

In addition, the torque map shown in FIG. 3 has a peak region A1 (−Vn to +Va1) of a torque command value on a positive side of the operation origin Vn, which generates starting torque in the forward moving direction, and a peak region B1 (−Vn to −Vb1) of a torque command value on a negative side of the operation origin Vn, which generates starting torque in the backward moving direction.

By this configuration, in a state in which the electric vehicle 1 is stopping, immediately in response to an operation of gripping and pushing the rear handle 3 by the user, the torque assist is executed, and it is made possible to promptly start moving of the electric vehicle 1 and to cause the electric vehicle 1 to shift to steady forward traveling (A2). In addition, in response to an operation of pulling the rear handle 3 by the user, it is made possible to cause the electric vehicle 1 to promptly shift to steady backward traveling (B2).

Furthermore, the torque map shown in FIG. 3 has a steady torque region A2 (+Va1 to +Va2) in the forward moving direction, which is on a further positive side in the peak region A1 on the forward moving side and has a steady torque region B2 (−Vb1 to −Vb2) in the backward moving direction, which is on a further negative side in the peak region B1 on the backward moving side.

Although in order to compensate for frictional resistance which increases in accordance with a speed of the electric vehicle 1, the steady torque region A2 (+Va1 to +Va2) in the forward moving direction increases in accordance with the rotation speed V, it is intended that torque assist be executed in accordance with a standard walking speed of an assumed user by a torque command value in the neighborhood of rating of each of the left and right motors 41.

Although something similar is applied also to the steady torque region B2 (−Vb1 to −Vb2) in the backward moving direction, because a walking speed during the backward moving is slow, as compared with a walking speed during the forward moving, it is preferable that a torque command value itself be less than that in the steady torque region A2 in the forward moving direction and an increasing rate of the torque command value in accordance with the rotation speed also be small, and the torque command value in the steady torque region B2 in an example shown in FIG. 3 is constant.

Furthermore, the torque map shown in FIG. 3 has a braking torque region A3 (+V2 to +V3) in the forward moving direction, which is on a further positive side in the steady torque region A2 on the forward moving side, and has a braking torque region B3 (−Vb2 to −Vb3) in the backward moving direction, which is on a further negative side in the steady torque region B2 on the backward moving side.

In the braking torque region A3 in the forward moving direction, a torque command value is decreased as a traveling speed of the electric vehicle 1 approaches an upper limit in a standard walking speed range of the assumed user (for example, 6 km/h), braking torque is further generated for the electric vehicle 1 by executing torque assist in a direction inverse to a traveling direction in the neighborhood of the upper limit in the assumed walking speed range, and a traveling speed of the electric vehicle 1 is controlled to fall within the assumed walking speed range.

Although the similar is applied also to the braking torque region B3 in the backward moving direction, because a walking speed during the backward moving is slow, as compared with a walking speed during the forward moving, braking torque of a lower rotation speed lower than a rotation speed on the forward moving side is generated.

As described hereinbefore, the torque command values in accordance with the peak region A1 (starting torque region), the steady torque region A2, and the braking torque region A3 in the forward moving direction are given by the torque map shown in FIG. 3, the operation of gripping and pushing the rear handle 3 by the user is thereby further promptly started and shifting to the steady torque region A2 is performed, and thereafter, by exceeding the steady torque region A2 and increasing the speed, the torque assist in a braking direction is executed in the braking torque region A3, and when deceleration to a value not greater than values in the steady torque region A2 is performed, the torque assist in a speed increasing direction is executed in the peak region A1. Therefore, the steady torque region A2 corresponding to the standard walking speed range (+Va1 to +Va2) is maintained only by the simple operation of gripping and pushing/pulling the rear handle 3 by the user without special awareness of the user, thus leading to advantages in that stable assist can be performed.

In addition, in the above-described torque assist control, increase and decrease of the rotation speed V by the operations of gripping and pushing/pulling the rear handle 3 by the user and increase and decrease of the rotation speed V by driving of the left and right motors 41 (torque assist) are not distinguished (it is not necessary to distinguish therebetween), and the torque assist is executed in accordance with the rotation speed V as a result of cooperative operations of the operation of gripping and pushing the rear handle 3 by the user and the operation by the driving force of the left and right motors 41. Therefore, not only is a force sensor (pressure sensor or the like) which detects a direction and a magnitude of a force with which the user pushes/pulls the rear handle 3 unnecessary, but also the control is not influenced by variation in the direction and the magnitude of a detected force, thus leading to advantages in that a vehicle body structure and control are simplified.

(Turning Assist in Walking Assisting Vehicle Mode)

Next, a turning assist in the walking assisting vehicle mode (1) will be described with reference to FIGS. 5A to 5C.

As already described, in the electric vehicle 1, each of the motor units 40 (40L and 40R) of the left and right driving wheels 4L and 4R includes the rotation speed sensor 43, and in a case in which the operation of pushing/pulling the vehicle body 2 is performed with left and right forces which are different from each other in a state in which the user grips the rear handle 3 by left and right hands (or either one of the hands), a difference between rotation speeds of the left and right driving wheels 4L and 4R is caused.

Figure 5A:
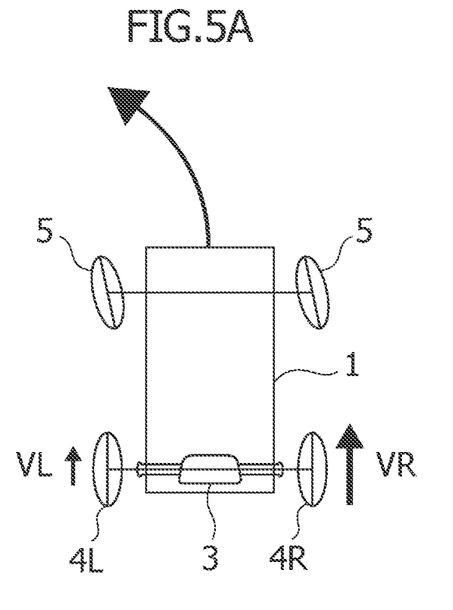
FIG. 5A is a schematic plan view showing a turning assist.
Figure 5B:
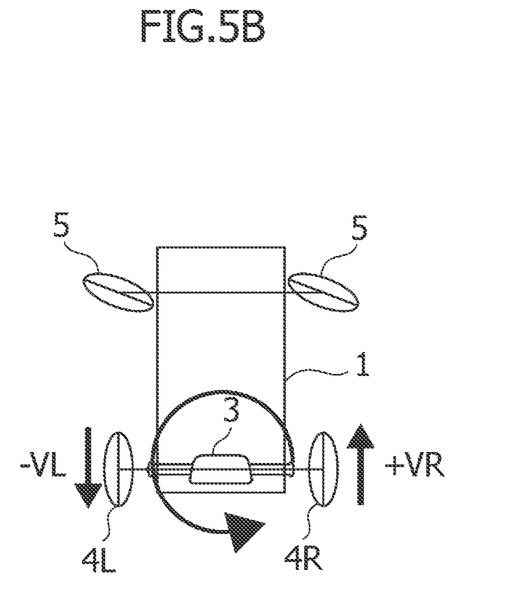
FIG. 5B is a schematic plan view showing a turning assist on the spot (spin turn).

For example, as shown in FIG. 5A, by relatively strongly pushing a right side of the rear handle 3, a rotation speed VR, which is greater than a rotation speed VL of the driving wheel 4L on a left side, is detected for the driving wheel 4R on the right side, and a rotation speed difference ΔV=VR−VL between the rotation speeds VR and VL detected by the left and right rotation speed sensors 43 is caused. Here, when the torque map shown in FIG. 3 is applied to control of the motor units 40 (40L and 40R) of the left and right driving wheels 4L and 4R as it is, even if a slight rotation speed difference is caused, the rotation speed difference is increased by left and right individual torque assists, the electric vehicle 1 turns, and stable forward moving/backward moving cannot be thereby performed.

Figure 5C:
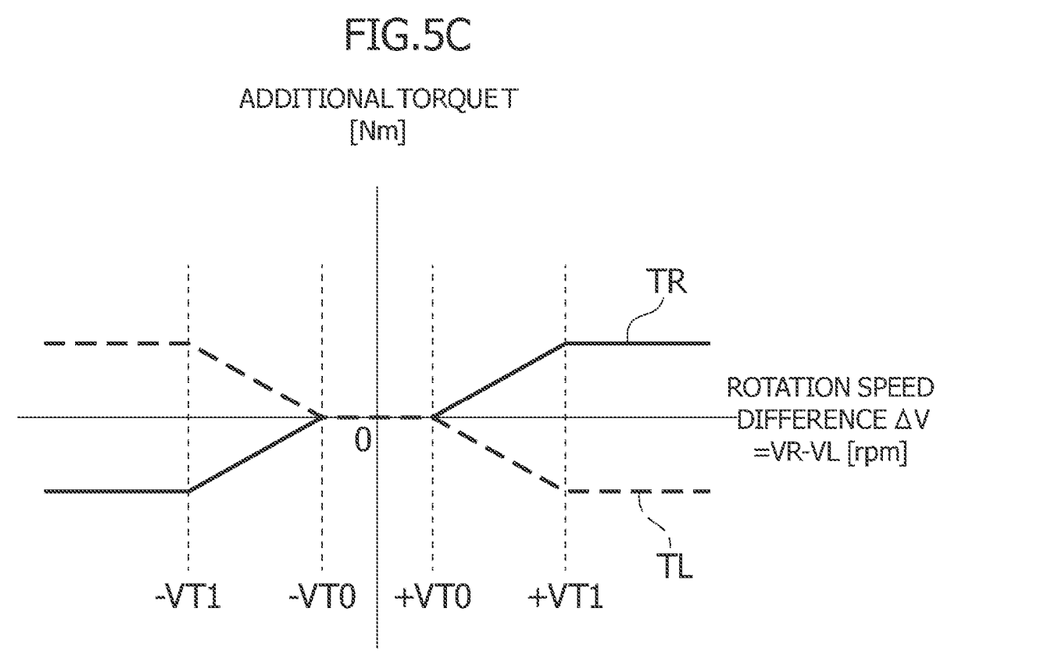
FIG. 5C shows an additional torque map at turning time.

Therefore, as shown in FIG. 5C, a torque assist in accordance with the rotation speed difference ΔV is executed as described below by a torque map which defines relationship between the rotation speed difference ΔV of the left and right driving wheels 4L and 4R and additional torque TL and TR, thereby allowing stable forward moving/backward moving assist and turning assist to be appropriately executed in accordance with circumstances.

(i) When the rotation speed difference ΔV of the left and right driving wheels 4L and 4R is less than a predetermined threshold value±VT0, the rotation speed difference ΔV of the left and right driving wheels 4L and 4R is ignored, in accordance with the torque map in FIG. 3, torque of either one of the left and right rotation speeds VR and VL or torque, which is selected from mean values (average values) of the left and right rotation speeds VR and VL and is equal in principle, is generated in the left and right motor units 40 (40L and 40R), and the forward moving/backward moving assist is executed.

(ii) When the rotation speed difference ΔV of the left and right driving wheels 4L and 4R is equal to or greater than the predetermined threshold value±VT0, turning assist control in which in accordance with the rotation speed difference ΔV, a torque command value of one of the motors, a rotation speed of which is greater than a rotation speed of another one of the motors, is increased and a torque command value of one of the motors, a rotation speed of which is less than a rotation speed of another one of the motors, is decreased is executed.

(iii) However, when the rotation speed difference ΔV of the left and right driving wheels 4L and 4R is equal to or greater than a second threshold value±VT1, without increasing and decreasing the torque command values in accordance with the rotation speeds, turning assist control is executed by torque command values TL and TR which cope with the second threshold value±VT1.

By performing the above-described turning assist control, steering resistance caused on the driven wheels 5 is compensated, light and reliable turning assist can be executed by an operation of pushing one side of the rear handle 3. In addition, as shown in FIG. 5B, a light and reliable turning (spin turn) assist on the spot can be executed by operations of pushing one side of the rear handle 3 and pulling the other side thereof.

(Uphill/Downhill Assist in Walking Assisting Vehicle Mode)

Figure 6A:
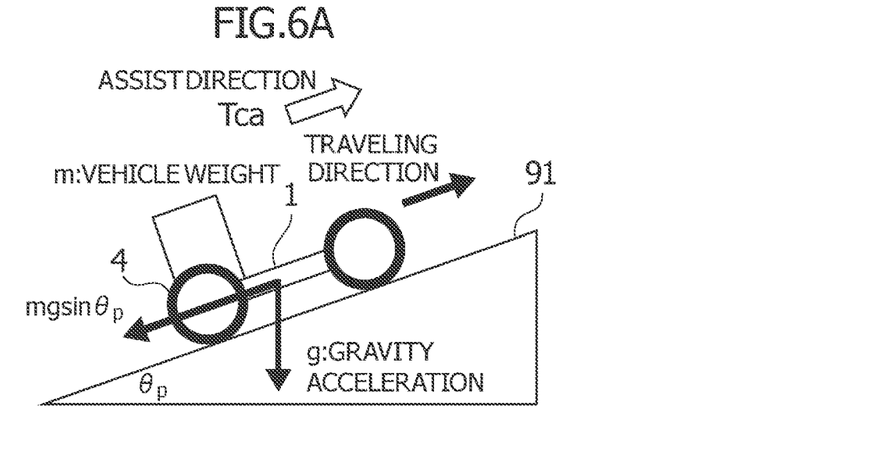
FIG. 6A is a schematic side view showing an upward inclination compensation assist.
Figure 6B:
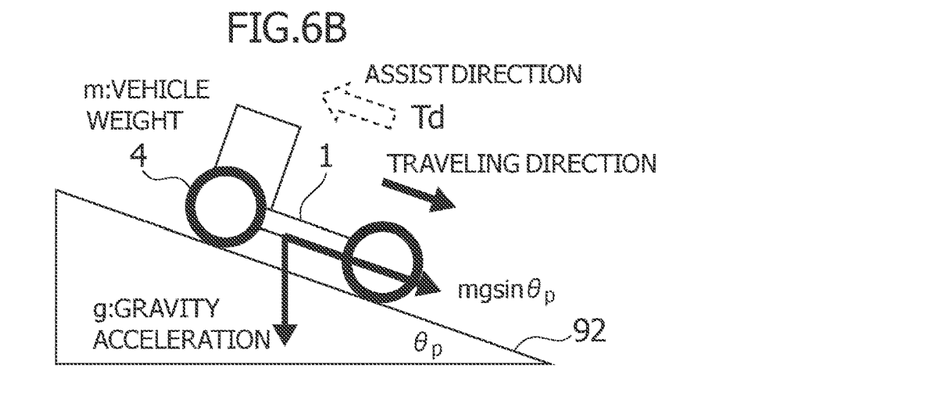
FIG. 6B is a schematic side view showing a downward inclination compensation assist.

Next, an uphill/downhill assist in the walking assisting vehicle mode (1) will be described with reference to FIGS. 6A to 6C.

In the description given hereinbefore, for the sake of convenience, the control on a flat road is described. However, on an uphill road 91 shown in FIG. 6A and a downhill road 92 shown in FIG. 6B, due to a gravity exerted on the vehicle body 2, loads (mg·sin θp) in a direction inverse to a traveling direction/a direction same as the traveling direction are caused in accordance with a vehicle weight m and an inclination θp.

Figure 6C:
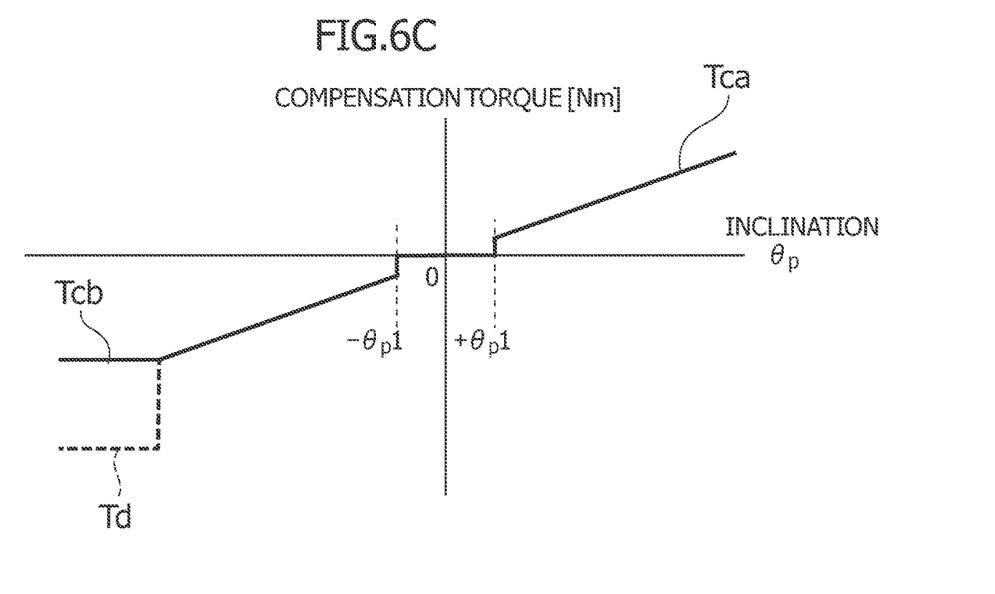
FIG. 6C is a torque map illustrating compensation torque.

Therefore, on the uphill road 91 and the downhill road 92, a torque map shown in FIG. 6C is used in combination, and compensation torque Tca, Tcb, and Td which offset the loads caused in accordance with the inclination (angle) θp which is detected by the inclination sensor 20 are added to a torque command value.

Note that a threshold value (less than ±θp1 and a dead zone) is set for the inclination θp, and in a case in which the inclination θp is less than the threshold value and no influence is exerted on the basic control and the turning control, the torque compensation is not performed.

(i) When the electric vehicle 1 goes up on the uphill road 91 having an inclination θp1 or more and moves forward, in order to offset a load in an inverse direction, which is weighted in accordance with the inclination θp of the uphill road 91, as indicated by a solid line on a right side of the torque map in FIG. 6C, compensation torque Tca in the same direction, which increases in proportion to the inclination θp of the uphill road 91 is added and an uphill assist is executed.

(ii) When the electric vehicle 1 goes down on the uphill road 91 having the inclination θp1 or more and moves downward, since a load in the same direction as a backward moving direction, which is weighted in accordance with the inclination θp of the uphill road 91, is caused, as indicated by a solid line on a left side of the torque map in FIG. 6C, compensation torque Tcb in an inverse direction (regeneration direction), which increases in proportion to the inclination θp of the uphill road 91 is added and a braking assist is executed.

(iii) When the electric vehicle 1 goes down on the downhill road 92 having the inclination θp1 or more and moves forward, since a load in the same direction as the traveling direction, which is weighted in accordance with the inclination θp of the downhill road 92, is caused, as indicated by a solid line and a broken line on the left side of the torque map in FIG. 6C, compensation torque Td in an inverse direction (regeneration direction), which increases in proportion to an inclination θp of the downhill road 92, is added and a braking assist is executed, similarly. However, when the inclination θp has reached a predetermined threshold value, predetermined braking torque is generated and braking control is executed.

Figure 7:
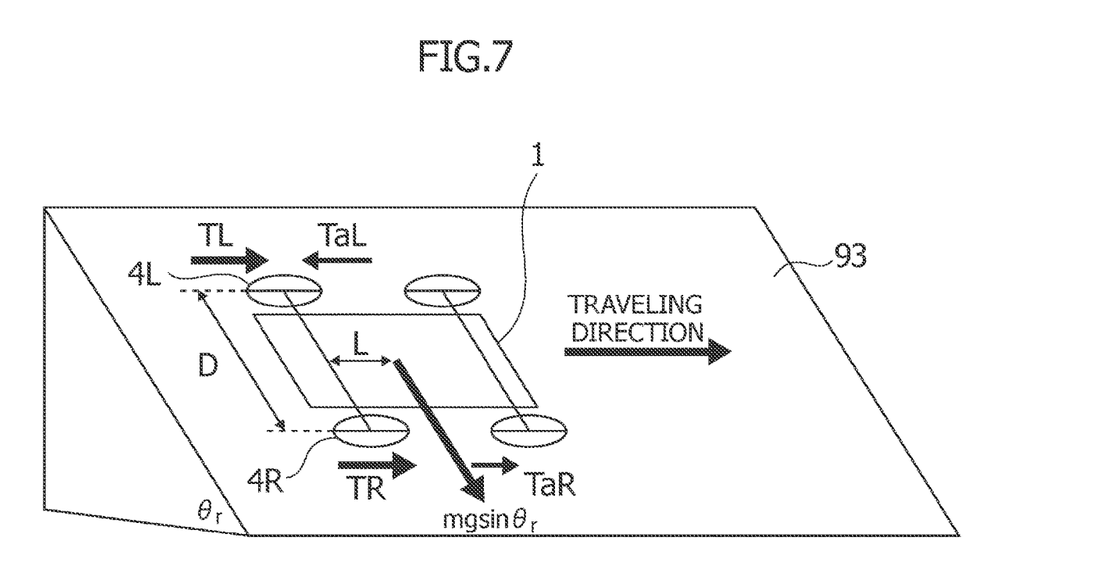
FIG. 7 is a schematic perspective view showing a lateral inclination compensation assist.

FIG. 7 shows a lateral inclination compensation assist in a case in which the electric vehicle 1 in the walking assisting vehicle mode (1) moves forward on a road surface 93 which has an inclination (lateral inclination θr) in a direction intersecting with a traveling direction of the electric vehicle 1 (or a case in which the electric vehicle 1 moves forward in a direction intersecting with the inclination θr of the slope 93).

In other words, in FIG. 7, in a case in which there is a center of gravity with a distance L which lies ahead with respect to an axle of the driving wheels 4L and 4R, a deflection moment (mg·sin θr·L) toward a downward direction of the lateral inclination θr is caused for the electric vehicle 1 by gravity mg acting on the center of gravity and the lateral inclination θr.

Therefore, in order to offset this deflection moment by assist torque by the motor units 40 (40L and 40R) of the left and right driving wheels 4L and 4R, compensation torque TaL and TaR in directions, which are inverse to each other, are added to the left and right motor units 40 (40L and 40R) so as to generate a couple of forces which corresponds to a compensation moment with a center (D/2) of a tread width D as a center. When a radius of each of the driving wheels 4L and 4R is defined as r and a coefficient in consideration of traveling resistance of a road surface or the like is defined as δ, the compensation torque TaL and TaR coping with the lateral inclination θr can be given by the following formula.

$$TaL = TaR = \delta \cdot mg \cdot \sin \theta r \cdot Lr/D$$

Note that a threshold value (dead zone) is set also for the lateral inclination θr and in a case in which the lateral inclination θr is less than the threshold value and no influence is exerted on the basic control and the turning control, the lateral inclination compensation assist is not performed.

When the electric vehicle 1 configured as described above is turned on by operating a key 11 and the system is activated, in accordance with a frame form when activated, the walking assisting vehicle mode (1) or the riding mode (1') is set. Note that as already described, in a state in which the electric vehicle 1 is stopping, the electromagnetic brake 42 is in a locked state.

Figure 4:
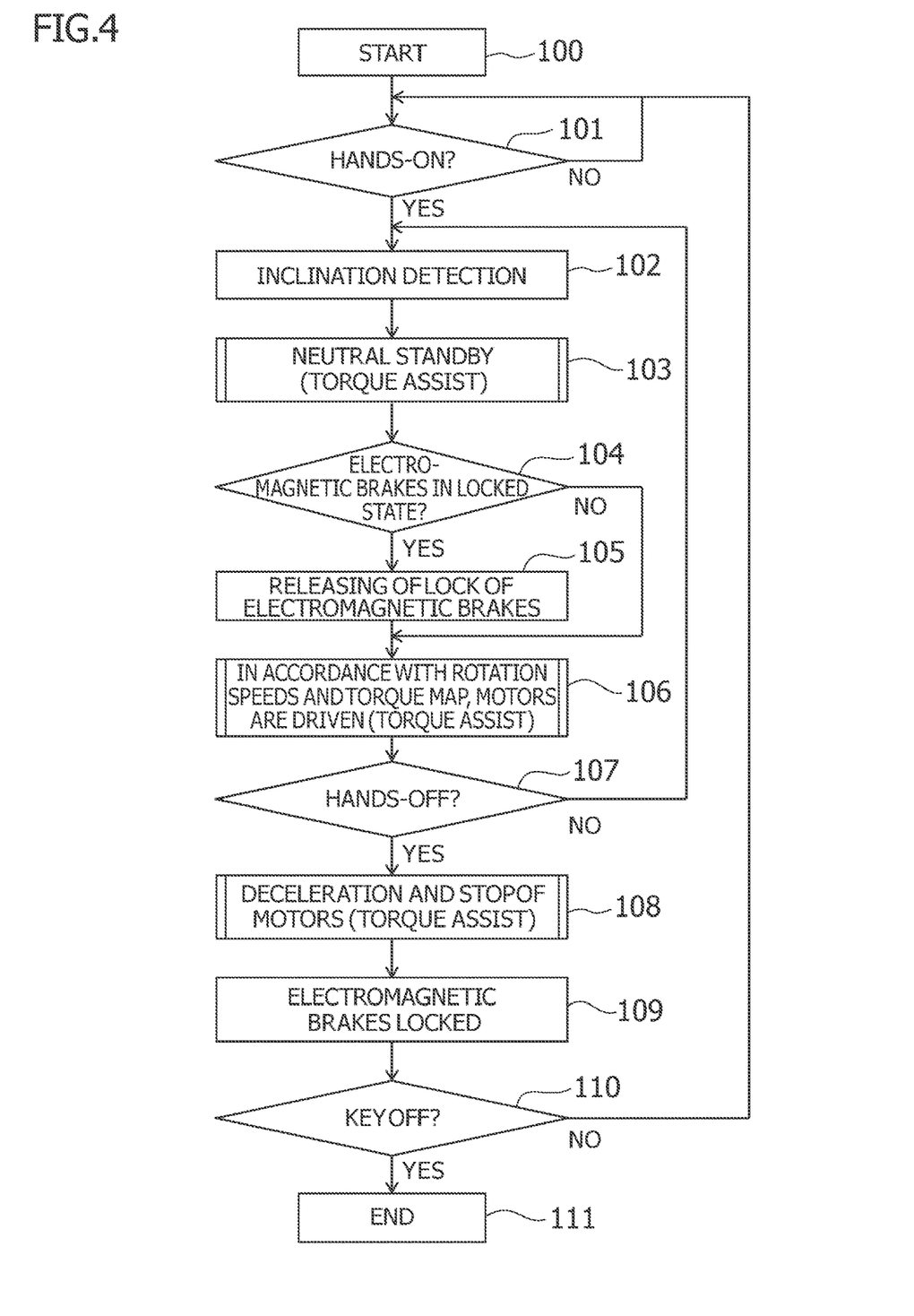
FIG. 4 is a flowchart showing control of the electric walking assisting vehicle according to the Embodiment of the present invention.

Hereinafter, control in a case in which the walking assisting vehicle mode (1) is set when activated or the walking assisting vehicle mode (1) is set by an operation performed by the user in a state in which the electric vehicle 1 is stopping after the activation will be described with reference to a flowchart in FIG. 4.

First, when the walking assisting vehicle mode (1) is set (step 100), the gripping sensor 30 is in an operation state. In this state, when the user grips the rear handle 3 and the gripping sensor 30 detects a gripping state (hands-on) (step 101), the inclination sensor 20 detects the inclination θp in the forward-backward direction of the vehicle body 2 and the inclination θr in a lateral direction (step 102).

When the inclination θp in the forward-backward direction and/or the inclination θr in the lateral direction are/is equal to or greater than the threshold value, torque assist in which the compensation torque Tca, Tcb, and Td and/or the compensation torque TaL and TaR are generated in the left and right motor units 40 (40L and 40R) is executed and in a neutral state in which initial torque in a forward moving direction is applied to the left and right driving wheels 4L and 4R, the electric vehicle 1 stands by (step 103).

Subsequently, it is checked whether or not the left and right electromagnetic brakes 42 are in a locked state (step 104), and when the left and right electromagnetic brakes 42 are in the locked state (at initial activation time or the like), lock of the left and right electromagnetic brakes 42 is released (step 105).

At this time, although the electric vehicle 1 is at rest, an external force resulting from the inclination is offset by compensation torque, and regardless of absence or presence of the inclination, the electric vehicle 1 is in an immediately movable state. In this state, the user performs the operation of pushing/pulling the rear handle 3, whereby the left and right driving wheels 4L and 4R are rotated, and when rotation speeds V (VL and VR) are detected by the rotation speed sensor 43, in accordance with the rotation speeds V (VL and VR) and the torque map, torque is generated in the left and right motor units 40 (40L and 40R), and the torque assist such as the forward moving/backward moving/turning is executed (step 106).

Also, while the electric vehicle 1 is traveling, detection of the gripping state (hands-on) by the gripping sensor 30 is continued (step 107), and when the gripping state comes not to be detected by the gripping sensor 30 and the control unit 10 determines hands-off, torque command values for the left and right motor units 40 (40L and 40R) are gradually decreased, and torque assist in which the electric vehicle 1 is decelerated and stopped is executed (step 108). Together therewith, after a lapse of predetermined time (for example, two seconds) from the hands-off, the left and right electromagnetic brakes 42 are locked (step 109).

In a state in which the left and right electromagnetic brakes 42 are locked, when an operation of turning off the key 11 is detected (step 110), electric power supply to the left and right motor units 40 (40L and 40R) is stopped and thereafter, the system is shut down (step 111).

Hereinbefore, the Embodiment of the present invention is described. However, the present invention is not limited to the above-described Embodiment, and a variety of variations and modifications of the present invention can be further made based on the technical concept of the present invention.

For example, although in the Embodiment described above, the case in which the electric walking assisting vehicle 1 includes the compact electric vehicle mode (riding mode) is described, the present invention can be implemented as an electric walking assisting vehicle including no riding mode.

In addition, although in the Embodiment described above, the case in which, as the driven wheels 5, the omni-wheels are used is described, caster-type universal wheels can also be used.

The invention claimed is:

1. An electric walking assisting vehicle comprising:
a vehicle body having a forward-backward direction and a width direction;
left and right driving wheels provided spaced apart in the width direction of the vehicle body;
left and right motors connected so as to respectively transmit power to the left and right driving wheels;
universal wheels provided spaced apart from the left and right driving wheels in the forward-backward direction of the vehicle body;
a gripping part provided in an upper portion of the vehicle body so as to be gripped by a user in a standing and walking posture;
a gripping sensor for detecting that the gripping part is gripped by the user;
left and right rotation speed sensors for individually detecting rotation speeds of the left and right driving wheels; and a control unit for controlling the left and right motors,
wherein the control unit is configured to generate torque in the left and right motors in accordance with a torque map which defines relationships between the rotation speeds of the left and right driving wheels detected by the left and right rotation speed sensors and torque command values of the left and right motors in a state in which the gripping sensor is detecting the gripping, and wherein in the torque map, an operation origin is set on a negative side in a rotation direction of the left and right driving wheels, the rotation direction being detected by the left and right rotation speed sensors, and the torque map has a peak region on a positive side of the operation origin, starting torque in a forward moving direction being generated in the peak region on the positive side, and has a peak region on a negative side of the operation origin, starting torque in a backward moving direction being generated in the peak region on the negative side.

2. The electric walking assisting vehicle according to claim 1, wherein the torque map has a steady torque region in the forward moving direction on a further positive side in the peak region on the positive side, has a steady torque region in the backward moving direction on a further negative side in the peak region on the negative side, and a torque command value in the steady torque region on the negative side is less than a torque command value in the steady torque region on the positive side and/or an increasing rate of the torque command value in accordance with a rotation speed in the steady torque region on the negative side is less than an increasing rate of the torque command value in accordance with a rotation speed in the steady torque region on the positive side.

3. The electric walking assisting vehicle according to claim 2, wherein the torque map has a braking torque region in the forward moving direction on the further positive side in the steady torque region on the positive side and has a braking torque region in the backward moving direction on the further negative side in the steady torque region on the negative side.

4. The electric walking assisting vehicle according to claim 1, wherein the control unit is configured such that when a rotation speed difference of the left and right driving wheels is less than a predetermined threshold value, the rotation speed difference being detected by the left and right rotation speed sensors, the control unit ignores the rotation speed difference of the left and right driving wheels, and in accordance with any of the rotation speeds of the left and right driving wheels or the torque command value selected from mean values of the rotation speeds, the control unit executes torque assist.

5. The electric walking assisting vehicle according to claim 4, wherein the control unit is configured such that when the rotation speed difference is equal to or greater than the predetermined threshold value, in accordance with the rotation speed difference, the control unit executes turning assist control so as to increase the torque command value of one of the motors, the rotation speed of which is greater than the rotation speed of another one of the motors and decreases the torque command value of one of the motors, the rotation speed of which is less than the rotation speed of another one of the motors.

6. The electric walking assisting vehicle according to claim 4, wherein the control unit is configured such that when the rotation speed difference of the left and right driving wheels is equal to or greater than the predetermined threshold value, the rotation speed difference being detected by the left and right rotation speed sensors, and the rotation speed of one of the driving wheels, the rotation speed of which is greater than a rotation speed of another one of the driving wheels, is equal to or greater than an upper limit value, the control unit sets the torque command value of the one of the driving wheels to zero.

7. The electric walking assisting vehicle according to claim 1, wherein the vehicle body includes a foldable seat and an operation part which is operable by the user seated on the seat, and the electric walking assisting vehicle is usable as a compact electric vehicle.

8. An electric walking assisting vehicle comprising:
a vehicle body having a forward-backward direction and a width direction;
left and right driving wheels provided spaced apart in the width direction of the vehicle body;
left and right motors connected so as to respectively transmit power to the left and right driving wheels;
universal wheels provided spaced apart from the left and right driving wheels in the forward-backward direction of the vehicle body;
a gripping part provided in an upper portion of the vehicle body so as to be gripped by a user in a standing and walking posture;
a gripping sensor for detecting that the gripping part is gripped by the user;
left and right rotation speed sensors for individually detecting rotation speeds of the left and right driving wheels;
a control unit for controlling the left and right motors,
an electromagnetic brake for locking the left and right driving wheels or the left and right motors; and
an inclination sensor for detecting an inclination in each of the forward-backward direction and the width direction of the vehicle body, wherein
the control unit is configured to generate torque in the left and right motors in accordance with a torque map which defines relationships between the rotation speeds of the left and right driving wheels detected by the left and right rotation speed sensors and torque command values of the left and right motors in a state in which the gripping sensor is detecting the gripping, and
the control unit is configured such that in a state in which the gripping sensor has detected the gripping, the control unit sets the inclination sensor in an operating state, executes neutral standby control in which in accordance with the inclination detected by the inclination sensor, compensation torque offsetting a rotation force generated on the left and right driving wheels by a gravity exerted on the vehicle body is generated for the left and right motors, and in a state in which the compensation torque is generated, the control unit unlocks the electromagnetic brake.

9. The electric walking assisting vehicle according to claim 8, wherein the control unit is configured such that when during torque control for the left and right motors in accordance with the rotation speeds of the left and right driving wheels, the gripping sensor does not detect the gripping, the control unit gradually decreases torque command values of the left and right motors and after predetermined time, sets the electromagnetic brake in a locked state.

10. The electric walking assisting vehicle according to claim 8, further comprising a releasing part which releases lock of the electromagnetic brake during stopping of the left and right motors.

* * * * *